(12) United States Patent
Liu et al.

(10) Patent No.: US 12,039,637 B2
(45) Date of Patent: Jul. 16, 2024

(54) LOW DOSE SINOGRAM DENOISING AND PET IMAGE RECONSTRUCTION METHOD BASED ON TEACHER-STUDENT GENERATOR

(71) Applicant: ZHEJIANG UNIVERSITY, Hangzhou (CN)

(72) Inventors: Huafeng Liu, Hangzhou (CN); Qiupeng Feng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 508 days.

(21) Appl. No.: 17/434,700

(22) PCT Filed: Nov. 25, 2020

(86) PCT No.: PCT/CN2020/131293
§ 371 (c)(1),
(2) Date: Aug. 27, 2021

(87) PCT Pub. No.: WO2022/041521
PCT Pub. Date: Mar. 3, 2022

(65) Prior Publication Data
US 2022/0351431 A1  Nov. 3, 2022

(30) Foreign Application Priority Data
Aug. 31, 2020 (CN) .......................... 202010894249.7

(51) Int. Cl.
*G06T 11/00* (2006.01)
*G06N 3/084* (2023.01)
*G06T 5/70* (2024.01)

(52) U.S. Cl.
CPC ............ *G06T 11/005* (2013.01); *G06N 3/084* (2013.01); *G06T 5/70* (2024.01);
(Continued)

(58) Field of Classification Search
CPC ..................... G06T 11/005; G06T 5/70; G06T 2207/10104; G06T 2207/20081;
(Continued)

(56) References Cited

U.S. PATENT DOCUMENTS 10,679,385 B1 * 6/2020 Yanoff .................. G06T 11/003
11,481,937 B2 * 10/2022 Liu .......................... G06N 3/04
(Continued)

FOREIGN PATENT DOCUMENTS

WO     WO2019134879 A1     7/2019

OTHER PUBLICATIONS

Liu, Ruishan et al. "Teacher-Student Compression with Generative Adversarial Networks." arXiv: Learning (2018): n. pag. 1-12 (Year: 2018).*

*Primary Examiner* — Mia M Thomas
(74) *Attorney, Agent, or Firm* — Jiwen Chen; Joywin IP Law PLLC (57) ABSTRACT

The present invention discloses a low dose Sinogram denoising and PET image reconstruction method based on teacher-student generator, the adopted network model is divided into a Sinogram denoising module and a PET image reconstruction module, the entire network needs to be processed in a training stage and a test stage. In the training stage: the present invention uses the denoising module to denoise the low dose Sinogram, and then makes the reconstruction module use the denoised Sinogram to reconstruct, in which the teacher generator is introduced in the training stage to constrain the whole, the denoising module is decoupled from the reconstruction module, and a better reconstructed image is obtained through training. In the testing stage, the present invention only needs to input low-dose Sinogram to the denoising module to obtain the
(Continued)

denoised Sinogram, and then input the denoised Sinogram to the student generator to get the final reconstruction image.

8 Claims, 4 Drawing Sheets

(52) U.S. Cl.
CPC ............... *G06T 2207/10104* (2013.01); *G06T 2207/20081* (2013.01); *G06T 2207/20084* (2013.01)

(58) Field of Classification Search
CPC ..... G06T 2207/20084; G06T 2211/441; G06T 5/60; G06N 3/084; G06N 3/0455; G06N 3/0464; G06N 3/0475; G06N 3/094; G06N 3/096
See application file for complete search history.

(56) References Cited

U.S. PATENT DOCUMENTS

| | | | | |
|---|---|---|---|---|
| 2018/0018757 | A1* | 1/2018 | Suzuki | G06N 3/045 |
| 2019/0236763 | A1* | 8/2019 | Chan | A61B 6/032 |
| 2019/0325621 | A1* | 10/2019 | Wang | G06N 3/045 |
| 2020/0027252 | A1* | 1/2020 | Ye | G06T 5/70 |
| 2020/0043204 | A1* | 2/2020 | Fu | G06T 5/70 |
| 2020/0126231 | A1* | 4/2020 | Hu | G06T 11/005 |
| 2020/0294288 | A1* | 9/2020 | Smith | G06T 7/0012 |
| 2022/0130079 | A1* | 4/2022 | Hu | G06T 11/005 |
| 2022/0180482 | A1* | 6/2022 | Wang | G06T 5/70 |
| 2022/0233129 | A1* | 7/2022 | Liu | A61B 5/7267 |
| 2022/0240879 | A1* | 8/2022 | Souza | G06T 11/008 |
| 2022/0335665 | A1* | 10/2022 | Liu | G06T 11/006 |

* cited by examiner

LOW DOSE SINOGRAM DENOISING AND PET IMAGE RECONSTRUCTION METHOD BASED ON TEACHER-STUDENT GENERATOR

This is a U.S. national stage application of PCT Application No. PCT/CN2020/131293 under 35 U.S.C. 371, filed Nov. 25, 2020 in Chinese, claiming priority to Chinese Patent Applications No. 202010894249.7, filed Aug. 31, 2020, all of which are hereby incorporated by reference.

TECHNICAL FIELD

The present invention belongs to the field of biomedical image reconstruction, and in particular, the present invention relates to a low dose of Sinogram denoising and PET image reconstruction method based on teacher-student generator.

DESCRIPTION OF RELATED ART

Positron emission tomography (PET) system is as one of the important means of modern nuclear medicine imaging technology and clinical medical diagnosis, and has now been widely used in clinical treatment and drug development. PET imaging mainly uses the decay of radioactive isotopes to track and detect imaging. On the one hand, the projection data obtained directly from the PET scanner scans is only the information that matches the event saved by the PET system detector, which cannot be used directly and needs to go through a reconstruction algorithm to be used as a medical image that doctors can directly learn from. So far, PET image reconstruction is still a hot technology in the field of medical image reconstruction research. On the other hand, the image quality of PET reconstruction has always been limited by its injection dose and imaging time. The radiopharmaceuticals in PET imaging will radiate the patient, thereby increasing the risk of cancer. According to the principle of as low as reasonably achievable (ALARA) proposed by the International Commission for Radiological Protection, in PET clinical diagnosis, we will expect to use the smallest dose to obtain results that meet clinical testing and minimize the radiation dose to patients. Therefore, how to use low dose data to reconstruct high-quality PET images has always been a problem to be solved.

Generally speaking, low dose PET reconstruction methods are classified into two categories: iterative reconstruction algorithms and mapping learning. Among them, MLEM (maximum likelihood-expectation maximum), MAP (maximum a posteriori), PWLS (penalized weighted least square), TV (total variation) are all iterative reconstruction algorithms. These methods are based on certain data probability model assumptions (Poisson or Gaussian model), and also rely on the system matrix, and need to correct the projection data (sinogram data). For example, the publication [Zhang Quan, Fu Xuejing, Gui Zhiguo, Li Xiaohong, PET image MLEM reconstruction algorithm based on wavelet and anisotropic diffusion, Computer Applications and Software, Volume 30, Issue 11, November 2013] proposed MLEM algorithm. The MLEM algorithm requires the overall model construction of the noise of the collected projection data and the imaging system to realize the reconstruction of the low dose PET. In this process, the prior information of the system matrix of the instrument needs to be collected, and it needs to be iterated during testing and use. In order to get the best results, it takes a long time.

The other part is mapping learning, which mainly uses dictionary learning or neural network mapping learning to establish the relationship between the low dose reconstruction map and the normal-dose reconstruction map to restore the high-dose reconstruction map. For example, the publication [Du Qianqian, Qiang Yan, Li Shuo, Yang Xiaotang, PET image reconstruction algorithm based on hollow U-Net neural network, Journal of Taiyuan University of Technology, 2020-02] proposes to use U-Net to directly map low dose images to normal-dose images, but this method ignores the information in the sinogram domain. How to use the original signal in the sinogram domain to achieve denoising from the source of the data, and then realize the reconstruction from the low dose sinogram data to the PET image has become a very important research topic.

SUMMARY OF THE INVENTION

In view of the above, the present invention proposes a low dose Sinogram denoising and PET image reconstruction method based on a teacher-student generator, which can effectively restore low dose sinogram information and reconstruct high-quality PET images.

A low dose Sinogram denoising and PET image reconstruction method based on teacher-student generator, including the following steps:

(1) obtaining a normal dose Sinogram projection data collected by a PET system, and obtaining a corresponding PET image through reconstruction;

(2) using Poisson distribution to downsampling the normal dose Sinogram projection data to obtain a low dose Sinogram projection data;

(3) obtaining a large number of samples according to steps (1) and (2), each sample includes the low dose Sinogram projection data, the normal dose Sinogram projection data and its corresponding PET image;

(4) dividing all samples into a training set and a test set, building a network model including a denoising module and a reconstruction module, using the low dose Sinogram projection data of the samples in the training set as an input of the denoising module, using the normal dose Sinogram projection data as a true label of the denoising module, using an output of the denoising module and the normal dose Sinogram projection data together as an input of the reconstruction module, using the PET image corresponding the normal dose Sinogram projection data as a true label of the reconstruction module, then training the entire network model;

(5) inputting the low dose Sinogram projection data of the training set into a network model after training, reconstructing to obtain a corresponding PET image, and comparing it with the PET image corresponding the normal dose Sinogram projection data.

Further, a specific implementation of step (2) is: for the normal dose Sinogram projection data, a random number matrix with the same size as its Sinogram matrix is generated by using Poisson distribution firstly, a mean value of the random number matrix is set to a different size by setting different normalization coefficients, and then a mean value of the Sinogram matrix is changed to one-nth of the original through a matrix point multiplication operation, so as to obtain the low dose Sinogram projection data, n is a downsampling magnification.

Further, a process of the downsampling in step (2) is implemented using Python built-in library functions.

Further, the denoising module is composed of 7 convolutional blocks connected sequentially from input to output, the convolutional blocks are composed of a pixel attention layer and a multi-scale convolutional layer in connection, the pixel attention layer is composed of two 2D convolutional layers of 3×3 and a sigmoid activation function in connection, the multi-scale convolutional layer respectively uses 3×1, 1×3, 5×1, 1×5, and 7×1, 1×7 convolution kernels perform convolution operation, and the operation results of each convolution kernel are spliced together as an output.

Further, the reconstruction module is implemented by a teacher generator, a student generator, and a sorting discriminator. The structure of the teacher generator and the student generator is completely consistent, that is, the U-net network structure is adopted, and the downsampling is performed first to gradually reduce the size of an input data, and then deconvolution is used for upsampling to restore the reconstructed PET image size. The sorting discriminator adopts the patchGAN discriminator, that is, the reconstructed output PET images of the two generators are spliced together and input to the sorting discriminator, the sorting discriminator outputs a score to select a group of PET images with better reconstruction quality.

Further, the denoising module takes the low dose Sinogram projection data as an input, the normal dose Sinogram projection data as a true label, and a L2 distance between the two as a loss function for gradient back propagation training.

Further, the teacher generator uses the normal dose Sinogram projection data as an input, and the PET image corresponding the normal dose Sinogram projection data as a true label. The student generator uses the output of the denoising module as an input, and the PET image corresponding the normal dose Sinogram projection data as a true label. The sorting discriminator discriminates the output of the teacher generator, the output of the student generator, and the PET image corresponding to a normal dose Sinogram projection data pairwise to select a PET image with the best reconstruction quality. For the training of the reconstruction module, a GAN (Generative Adversarial Networks) loss provided by the sorting discriminator and a L1 distance between a reconstruction result output by the student generator and the PET image corresponding to a normal dose Sinogram projection data are used as a loss function for gradient back propagation training. For the teacher generator, since it is a momentum integration of the student generator, it does not participate in the gradient back propagation.

Further, in the test stage of step (5), without the participation of the teacher generator and the sorting discriminator, the low dose Sinogram projection data in the test set is input into the denoising module in the network model, and a denoised Sinogram projection is obtained through the denoising module, and then the denoised Sinogram projection data is input to the student generator, and the student generator reconstructs the corresponding PET image.

The present invention is a low dose Sinogram denoising and PET image reconstruction method based on teacher-student generator. The adopted network model is mainly divided into the Sinogram denoising module and the PET image reconstruction module. The entire network needs to be trained and tested. In the training stage, the present invention uses a denoising module to denoise the low dose Sinogram, and then the reconstruction module uses the denoised Sinogram to reconstruct, in which the teacher generator is introduced in the training stage to constrain the entire denoising and reconstruction process, and the denoising module and the reconstruction module are decoupled to obtain better reconstruction images. In the testing stage, the present invention only needs to input the low dose Sinogram projection data to the denoising module to obtain the denoised Sinogram, and then input the low dose Sinogram projection data to the student generator to obtain the final reconstructed image.

In summary, starting from the teacher-student generator, the present invention uses the denoising module to first denoise in the Sinogram domain, and then uses the denoising result to reconstruct the PET image by using the GAN network, which can effectively restore the Sinogram information of low dose to reconstruct a high-quality PET image.

DETAILED DESCRIPTION OF THE INVENTION

In order to describe the present invention more clearly, the technical solutions of the present invention will be described in detail below with reference to the accompanying drawings and specific embodiments.

The present invention is a low dose Sinogram denoising and PET image reconstruction method based on teacher-student generator, including the following steps:

S1. Obtaining a normal dose Sinogram projection data collected by a PET system, and obtaining a corresponding PET image through reconstruction. A random number matrix with the same size as its Sinogram matrix is generated by using Poisson firstly, a mean value of the random number matrix is set to a different size by setting different normalization coefficients, and then a mean value of the Sinogram matrix is changed to one-nth of the original through a matrix point multiplication operation, n is a downsampling magnification. The above steps are implemented using Python built-in library functions, after this transformation, the composition of the entire data set is a low dose Sinogram data, a normal dose Sinogram data, and a PET reconstruction images under normal dose, and the entire data set is divided into a training set, a validation set and a test set.

In this embodiment, the normal dose Sinogram projection data and the corresponding reconstruction image of 9 patients are collected, and the size of the Sinogram and the corresponding reconstruction are both 192×192. Using Poisson distribution to downsampling the normal dose Sinogram projection data to obtain a low dose Sinogram projection data, which is as an input of the subsequent model. The data of 6 patients are randomly selected as the training set, the data of 2 patients are used as the validation set, and the data of one patient is used as the test set.

Figure 1:
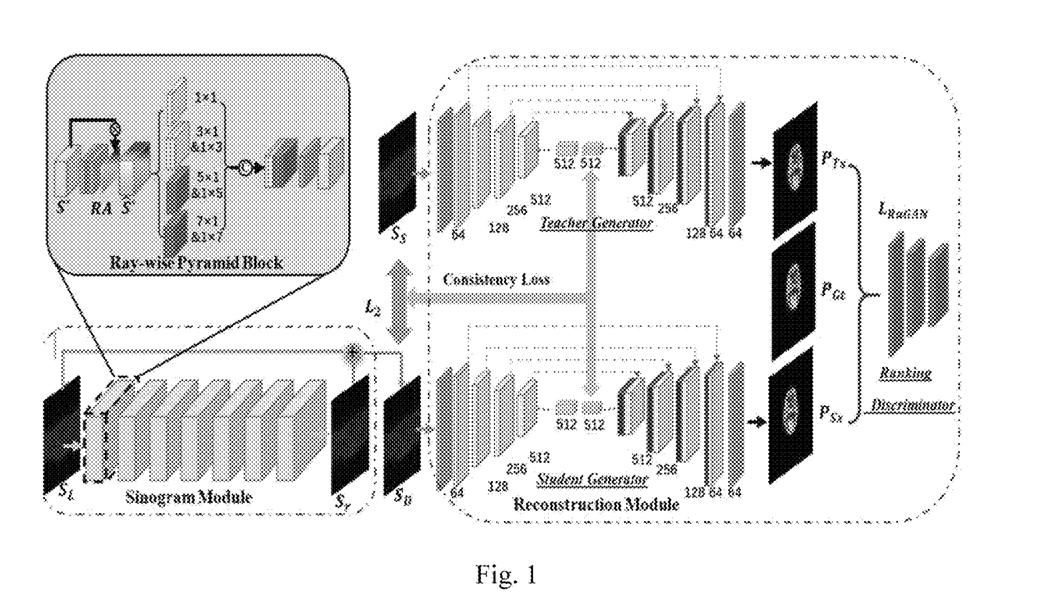
FIG. 1 is a schematic diagram of the overall structure of the network model used in the reconstruction method of the present invention.

S2. Building a network model including a denoising module and a reconstruction module, as shown in FIG. 1, to realize the denoising of sinogram and the reconstruction from sinogram to PET image.

The denoising module is composed of 7 convolutional blocks connected sequentially from input to output. Each convolutional block is composed of a pixel attention layer and a multi-scale convolutional layer, wherein the pixel attention layer is composed of two 2D convolutional layer of 3×3 and a sigmoid activation function, the specific formula is as follows:

$$RA=\sigma(Conv(\delta(Conv(S^*))))$$

Wherein, RA represents the ray attention layer, the input feature map is $S^*$, Conv represents the convolutional layer, $\delta$ represents the activation layer, and $\sigma$ is the sigmoid activation function. the multi-scale convolutional layer respectively uses 3×1, 1×3, 5×1, 1×5, and 7×1, 1×7 convolution kernels perform convolution operation, and the operation results of each convolution kernel are spliced together as an output to next convolution block.

Figure 2A:
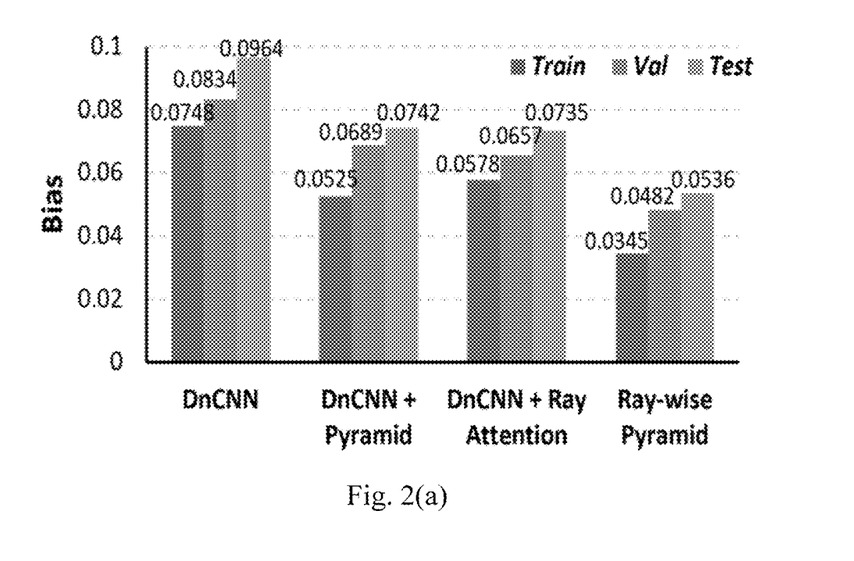
FIG. 2(a) is the denoising deviation result diagram of the denoising module in the reconstruction method of the invention.
Figure 2B:
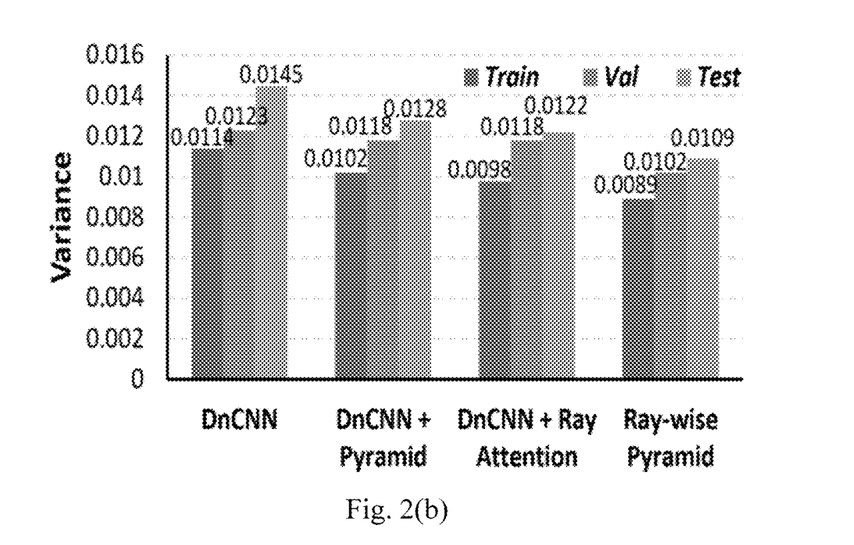
FIG. 2(b) is the denoising variance result diagram of the denoising module in the reconstruction method of the invention.

FIG. 2(a) and FIG. 2(b) respectively show the variance and bias of the denoising result whether to use the multi-scale convolution and the ray attention layer. It can be seen that the mechanism of the multi-scale convolution module and the ray attention can better denoise the sinogram, and obtain the result of smaller deviation and variance.

The reconstruction module is implemented by a teacher generator, a student generator, and a sorting discriminator. The structure of the teacher generator and the student generator is completely consistent, that is, the Unet network structure is adopted, and the downsampling is performed first to gradually reduce the size of an input data, and then deconvolution is used for upsampling to restore the reconstructed PET image size. The sorting discriminator adopts the patchGAN discriminator, the reconstructed output PET images of the two generators are spliced together and input to the sorting discriminator, the sorting discriminator outputs a score, the update method is as follows:

$$L_{RD}(P_{Gt},P_{Ss})=-(E((D(P_{Gt})-E(D(P_{Ss}))-1)^2)+E((D(P_{Ss})-E(D(P_{Gt}))+1)^2))$$

$$L_{RD}=L_{RD}(P_{Gt},P_{Ss})+\lambda_{TS}L_{RD}(P_{Ts},P_{Ss})+\lambda_{GT}L_{RD}(P_{Gt},P_{Ts})$$

Wherein, D( ) represents the discriminator, E( ) represents the calculation mathematical expectation, $\lambda$ is the balance factor of the hyperparameter, and P represents the input graph of the discriminator.

Figure 3:
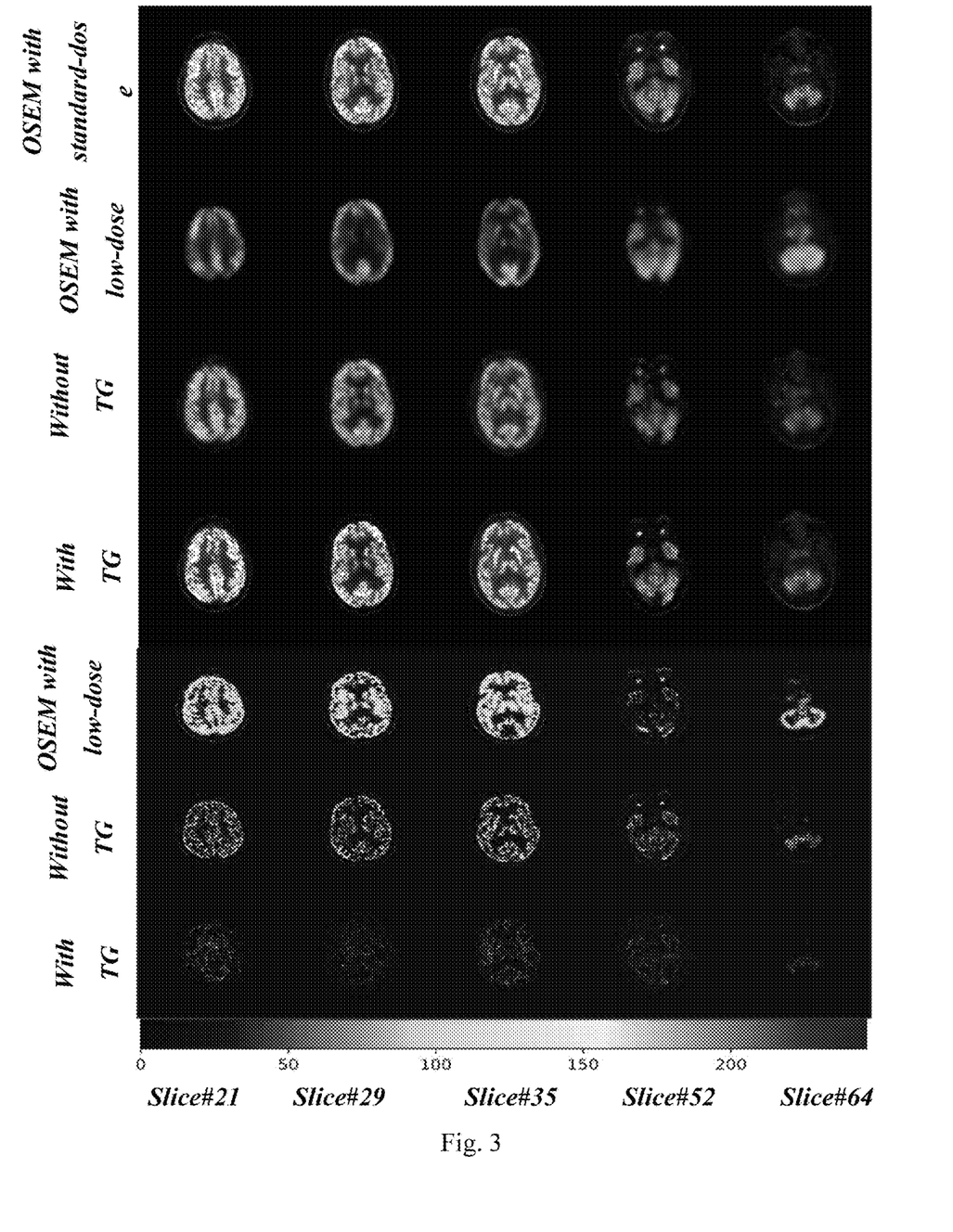
FIG. 3 is a comparison diagram of the reconstruction results with or without a teacher network reconstruction module in the reconstruction method of the present invention.
Figure 4:
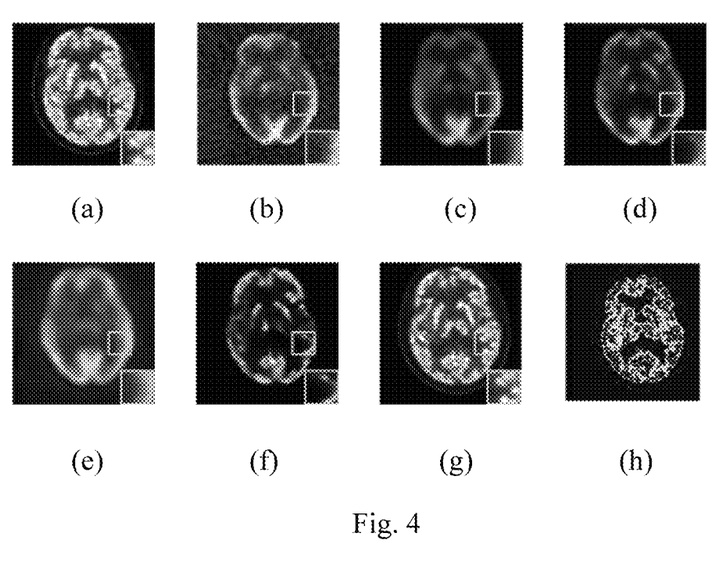
FIG. 4(a) shows the reconstruction results under normal dose.
FIG. 4(b) shows the reconstruction results of FBP algorithm at low dose.
FIG. 4(c) shows the reconstruction results of MLEM algorithm at low dose.
FIG. 4(d) shows the reconstruction results of TV algorithm at low dose.
FIG. 4(e) shows the reconstruction results of cGAN algorithm at low dose.
FIG. 4(f) shows the reconstruction results of u-net GAN algorithm at low dose.
FIG. 4(g) is a reconstruction result diagram of the algorithm of the present invention at low dose.
FIG. 4(h) shows the difference between the reconstruction result obtained by the algorithm of the invention and the reconstruction result under normal dose.

FIG. 3 shows the results and error comparison of using the teacher generator module and not using the teacher generator module; it can be seen that by using the teacher generator, the present invention can obtain a reconstruction map with more detailed information and more obvious structure information, the clinical significance is greater.

S3. In the training stage, the low dose sinogram data is used as an input of the denoising module, and the normal dose sinogram data is used as a label to be learned for training; then the sinogram output by the denoising module and the normal dose sinogram are used as an input of the reconstruction network, the PET images of normal dose are used as labels for training.

The denoising module takes the low dose Sinogram projection data as an input, the normal dose Sinogram projection data as a true label, and can be trained through a L2 distance between the two. For the reconstruction module, the inputs are: for the student generator, its input is the denoised sinogram output by the previous denoising module, and the label is the PET reconstruction image of normal dose and the output of the teacher generator. For the teacher generator, its input is the normal dose Sinogram projection data, and its label is the PET image corresponding the normal dose Sinogram projection data. For the sorting discriminator, discriminates the output of the teacher generator, the output of the student generator, and the PET image corresponding to a normal dose Sinogram projection data pairwise to select a PET image with a better reconstruction quality. For the training of the student generator, a GAN loss provided by the sorting discriminator and a L1 distance between a reconstruction result output by the student generator and the PET image corresponding to a normal dose Sinogram projection data are used as a loss function for gradient back propagation training. For the teacher generator, since it is a momentum integration of the student generator, it does not participate in the gradient back propagation.

$$\theta_t^T=\alpha\theta_{t-1}^T+(1-\alpha)\theta_t^S$$

Wherein, $\alpha$ is the balance factor of a hyperparameter, $\theta$ indicates the parameters of the network, the superscript T indicates the teacher network, S indicates the student network, and the subscript t indicates the number of iterations. At the same time, the last layer of the coding layer of the teacher generator and the student generator can provide the distance measurement of sinogram in the high-dimensional feature space to the previous denoising module, further strengthening the effect of the denoising module.

In this embodiment, the low dose Sinogram data and the normal dose sinogram data are first used as input and labels, and the denoising module is trained, using L2 loss, Adam optimization algorithm, 0.005 learning rate, and 50 epochs training.

Then the output sonogram and the normal dose sinogram data are input to the student generator and the teacher generator respectively, the reconstructed results are used to form a pair to update the weight of the sorting discriminator. Then the discriminator's discriminating result and the L1 distance between the student generator and other reconstructed images are used as a loss function to update the weight of the student generator by back propagation. The weight of the student generator is then used to update the weight of the teacher generator, in this process, a total of 100 iterations, the best model has been saved on the validation set.

S4. In the test stage, the low dose sinogram data is directly used the input of the denoising module to obtain the denoised sinogram output, and the denoised sinogram output is used as the input of the reconstruction module to obtain the reconstruction result image, and the reconstruction result image is compared with the reconstructed image of normal dose.

In the test stage, without the participation of teacher generator and sorting discriminator, the low dose sinogram data is first input to the denoising module, and the denoised sinogram is obtained through the denoising module, and then the denoised sinogram is input to the student to generator, the final result is the reconstructed image.

FIG. 4(a)~FIG. 4(g) show the reconstruction results of different methods. It can be seen from the figures that the method of the present invention obtains the best reconstruction results. Compared with other algorithms, the error between the reconstructed map of the present invention and the reconstructed map of normal dose is smaller, as shown in FIG. 4(h), and the structural information is basically restored. Some tiny structures can also be restored very well. The performance is better than other algorithms.

The entire algorithm of this implementation mode is tested in Ubuntu 16.04 LTS (64-bit) system, where the CPU is Core i7-7800X (3.5 GHz), the host memory is 32 GB RAM, and the graphics card model is NVIDIA GTX1080Ti (12 GB memory). In programming, the Pytorch1.0 platform is used to build the neural network. The platform is based on the Python language and can be used in combination in multiple program development environments.

The foregoing description of the embodiments is for the convenience of those of ordinary skill in the art to understand and apply the present invention. Those skilled in the art can obviously easily make various modifications to the above-mentioned embodiments, and apply the general principles described here to other embodiments without creative work. Therefore, the present invention is not limited to the above-mentioned embodiments. According to the disclosure of the present invention, those skilled in the art make improvements and modifications to the present invention should all fall within the protection scope of the present invention.

The invention claimed is:

1. A low dose Sinogram denoising and PET image reconstruction method based on teacher-student generator, including the following steps:
    (1) obtaining a normal dose Sinogram projection data collected by a PET system, and obtaining a corresponding PET image through reconstruction;
    (2) using Poisson distribution to downsampling the normal dose Sinogram projection data to obtain a low dose Sinogram projection data;
    (3) obtaining a large number of samples according to steps (1) and (2), each sample includes the low dose Sinogram projection data, the normal dose Sinogram projection data and its corresponding PET image;
    (4) dividing all samples into a training set and a test set, building a network model including a denoising module and a reconstruction module, using the low dose Sinogram projection data of the samples in the training set as an input of the denoising module, using the normal dose Sinogram projection data as a true label of the denoising module, using an output of the denoising module and the normal dose Sinogram projection data together as an input of the reconstruction module, using the PET image corresponding the normal dose Sinogram projection data as a true label of the reconstruction module, then training the entire network model; and
    (5) inputting the low dose Sinogram projection data of the training set into a network model after training, reconstructing to obtain a corresponding PET image, and comparing the obtained corresponding PET image with the PET image corresponding the normal dose Sinogram projection data.

2. The low dose Sinogram denoising and PET image reconstruction method according to claim 1, wherein, a specific implementation of step (2) is: for the normal dose Sinogram projection data, a random number matrix with the same size as its Sinogram matrix is generated by using Poisson firstly, a mean value of the random number matrix is set to a different size by setting different normalization coefficients, and then a mean value of the Sinogram matrix is changed to one-nth of the original through a matrix point multiplication operation, so as to obtain the low dose Sinogram projection data, n is a downsampling magnification.

3. The low dose Sinogram denoising and PET image reconstruction method according to claim 1, wherein, a process of the downsampling in step (2) is implemented using Python built-in library functions.

4. The low dose Sinogram denoising and PET image reconstruction method according to claim 1, wherein, the denoising module is composed of 7 convolutional blocks connected sequentially from input to output, each of the convolutional blocks is composed of a pixel attention layer and a multi-scale convolutional layer, the pixel attention layer is composed of two 2D convolutional layer of 3×3 and a sigmoid activation function, the multi-scale convolutional layer respectively uses 3×1, 1×3, 5×1, 1×5, and 7×1, 1×7 convolution kernels perform convolution operation, and the operation results of each convolution kernel are spliced together as an output.

5. The low dose Sinogram denoising and PET image reconstruction method according to claim 1, wherein, the reconstruction module is implemented by a teacher generator, a student generator, and a sorting discriminator; the structure of the teacher generator and the student generator is completely consistent, that is, the Unet network structure is adopted, and the downsampling is performed first to gradually reduce the size of an input data, and then deconvolution is used for upsampling to restore the reconstructed PET image size; the sorting discriminator adopts the patch-GAN discriminator, that is, the reconstructed output PET images of the two generators are spliced together and input to the sorting discriminator, the sorting discriminator outputs a score to select a group of PET images with better reconstruction quality.

6. The low dose Sinogram denoising and PET image reconstruction method according to claim 5, wherein, the teacher generator uses the normal dose Sinogram projection data as an input, and the PET image corresponding the normal dose Sinogram projection data as a true label; the student generator uses the output of the denoising module as an input, and the PET image corresponding the normal dose Sinogram projection data as a true label; the sorting discriminator discriminates the output of the teacher generator, the output of the student generator, and the PET image corresponding to a normal dose Sinogram projection data pairwise to select a PET image with the best reconstruction quality; for the training of the reconstruction module, a GAN loss provided by the sorting discriminator and a L1 distance between a reconstruction result output by the student generator and the PET image corresponding to a normal dose Sinogram projection data are used as a loss function for gradient back propagation training; for the teacher generator, since the teacher generator is a momentum integration of the student generator, the teacher generator does not participate in the gradient back propagation.

7. The low dose Sinogram denoising and PET image reconstruction method according to claim 5, wherein, in the test stage of step (5), without the participation of the teacher generator and the sorting discriminator, the low dose Sinogram projection data in the test set is input into the denoising module in the network model, and a denoised Sinogram projection is obtained through the denoising module, and then the denoised Sinogram projection data is input to the student generator, and the student generator reconstructs the corresponding PET image.

8. The low dose Sinogram denoising and PET image reconstruction method according to claim 1, wherein, the denoising module takes the low dose Sinogram projection data as an input, the normal dose Sinogram projection data as a true label, and a L2 distance between the two as a loss function for gradient back propagation training.

* * * * *